United States Patent [19]

Kimura

[11] Patent Number: 5,326,078
[45] Date of Patent: Jul. 5, 1994

[54] METAL DIAPHRAGM VALVE

[75] Inventor: Miyoshi Kimura, Yabutsukahonmachi, Japan

[73] Assignee: Benkan Corporation, Japan

[21] Appl. No.: 87,376

[22] Filed: Jul. 8, 1993

[51] Int. Cl.⁵ ............................................. F16K 7/16
[52] U.S. Cl. ...................................... 251/331; 251/359
[58] Field of Search .................. 251/331, 359, 335.2

[56] References Cited

U.S. PATENT DOCUMENTS

| | | | |
|---|---|---|---|
| 4,867,201 | 9/1989 | Carten | 251/331 X |
| 5,108,069 | 4/1992 | Tada et al. | 251/331 X |
| 5,112,027 | 5/1992 | Hanyu et al. | 251/331 |
| 5,131,627 | 7/1992 | Kolenc | 251/331 |
| 5,154,152 | 9/1992 | Komuro et al. | 251/331 |
| 5,201,492 | 4/1993 | Beauvir | 251/331 |
| 5,215,286 | 6/1993 | Kolenc | 251/331 X |

FOREIGN PATENT DOCUMENTS

| | | | |
|---|---|---|---|
| 0530947 | 3/1993 | European Pat. Off. | 251/331 |
| 0271168 | 11/1990 | Japan | 251/331 |

Primary Examiner—John Rivell
Attorney, Agent, or Firm—Eric P. Schellin

[57] ABSTRACT

An improved metal diaphragm valve is disclosed, in which the bed of the valve casing is made wider in its surface where the valve seat is mounted, than in conventional valves. The sufficiently spacious bed surface enables polishing easier, particularly in assembling micronized sizes of a valve. The simple design also makes it possible to use multiple-stage electropolishing, a technology used to obtain a mirror-like surface of casing bed. Since the bed of the valve casing has a wide enough space between the inner casing wall and the annular valve seat, the likelihood of fluid stagnation is lessened, causing fluid to flow smoothly from the inlet to outlet passage. The widened casing bed surface design is obtained because the annular valve seat caulked in position by expanding the rim of the inlet port in the fluid entrance passage that is bored concentrically of the central annular seat. This arrangement eliminates the conventional pair of collars used to securely fix the annual valve seat along both circumferences thereof.

3 Claims, 2 Drawing Sheets

METAL DIAPHRAGM VALVE

BACKGROUND OF THE INVENTION

1) Field of the Invention

This invention relates generally to a metal diaphragm valve which can be used in the fluid pipings of semiconductor producing equipment, and more particularly to such a device of micronized build, with small-diameter fluid passages.

2) Description of the Prior Art

There has been increased demand for micronized metal diaphragm valves for use in the fluid pipings of semiconductor manufacturing machines. As illustrated in FIG. 2, such a valve 20' consists a domed diaphragm 1 made of elastic metal material which is normally upwardly urged to bulge away from an annular valve seat 4 (as shown by broken line), that is mounted below the diaphragm, encased in a cylindrical casing 2. A valve drive system 3 is operatively connected to the diaphragm 1, and is operated to push a reciprocating piece 3a that is centrally mounted in the casing 2. The piece 3a, when depressed by the valve drive 3, physically exerts pressure on the diaphragm 1, and causes it to cave in and is brought into contact with the seat 4 below. When the diaphragm 1 is pressed sealingly against the seat 4, fluid-flow relationship is shut down between an inlet passage 10 and an outlet passage 13 that is formed below the casing 2.

When the drive system 3 releases the pressure on the reciprocating piece 3a, the diaphragm 1 retracts back, on its own elasticity, to the original convex position depicted by broken line in the drawing, thereby establishing fluid-flow relationship between the inlet passage 10 and outlet passage 13.

In conventional technologies, the annular valve seat 4 are fixedly secured, or caulked, in position in the casing bed 5 with a pair of annular collars 4a along both inner and outer circumferences of the seat. This caulking with collars, however, make the bed 5 irregular and bumpy in the surface, increasing a risk of stagnation of fluid in an area surrounding the ribbed valve seat 4, technically referred to as "dead zone".

Metal diaphragm valves have to be build small where they are used in the fluid pipings of semiconductor chip manufacturing equipment. In this application, their annular beds 5 have to have a sufficiently wide flat surface between the outer collar 4a and the inner walls of the casing 2, to remove the possibility of developing stagnation of fluid because of dead zone, when the diaphragm 1 is actuated to its opening position. As a result, after the diaphragm is fully closed, part of the fluid is left unevacuated. This undrained fluid leads to inefficient valve operation. Moreover, attempts at replacing fluid are often aborted since part of the fluid will refuse to leave the region of dead zone.

When the valve is built small as for the fluid piping of IC-chip assembling machines, the annular casing bed cannot be made to sufficiently wide because of technical difficulty. Grinding applied to the collar 4a has tended to leave metal particles or excessively polished patches to ruin the sealing capacity of the seat 4. Using multiple-stage electropolishing, an efficient technique to obtain a fine surface, is also be limited because of the narrow bed surface of the collars 4a.

SUMMARY OF THE INVENTION

The present invention has been proposed to eliminate the above and other disadvantages seen in the prior art metal diaphragm valves.

It is a primary object of the invention to provide a metal diaphragm valve in which the casing bed in which the annular valve seat is buried has a wide enough space between the inner casing wall and the valve seat. This spacious design of the casing bed surface will be particularly useful in constructing micronized valves because machining operation is easy. In addition, the sufficiently wide bed surface minimizes a risk of stagnation of fluid when the diaphragm is actuated to open.

It is another object to provide such a valve which is easy to build because the otherwise necessary caulking of an annular valve seat with collars on both sides of thereof as in conventional technologies can be removed.

The wide bed surface in the valve casing helps enable fluid to flow smoothly between the inlet and outlet passages even when the overall size of the casing is made small. Because the bed surface is not complicated as in conventional valves. The spacious surface of the casing bed also makes it possible to employ multiple-stage electropolishing to obtain enhanced bed smoothness.

BRIEF EXPLANATION OF THE ACCOMPANYING DRAWINGS

FIG. 1 is a cross-sectional schematic view of the core part of a metal diaphragm valve constructed in accordance with a preferred embodiment of the present invention, and FIG. 2 is a cross-sectional schematic view of the core part of a conventional metal diaphragm valve.

DETAILED DESCRIPTION OF THE PREFERRED EMBODIMENT

Figure 1:
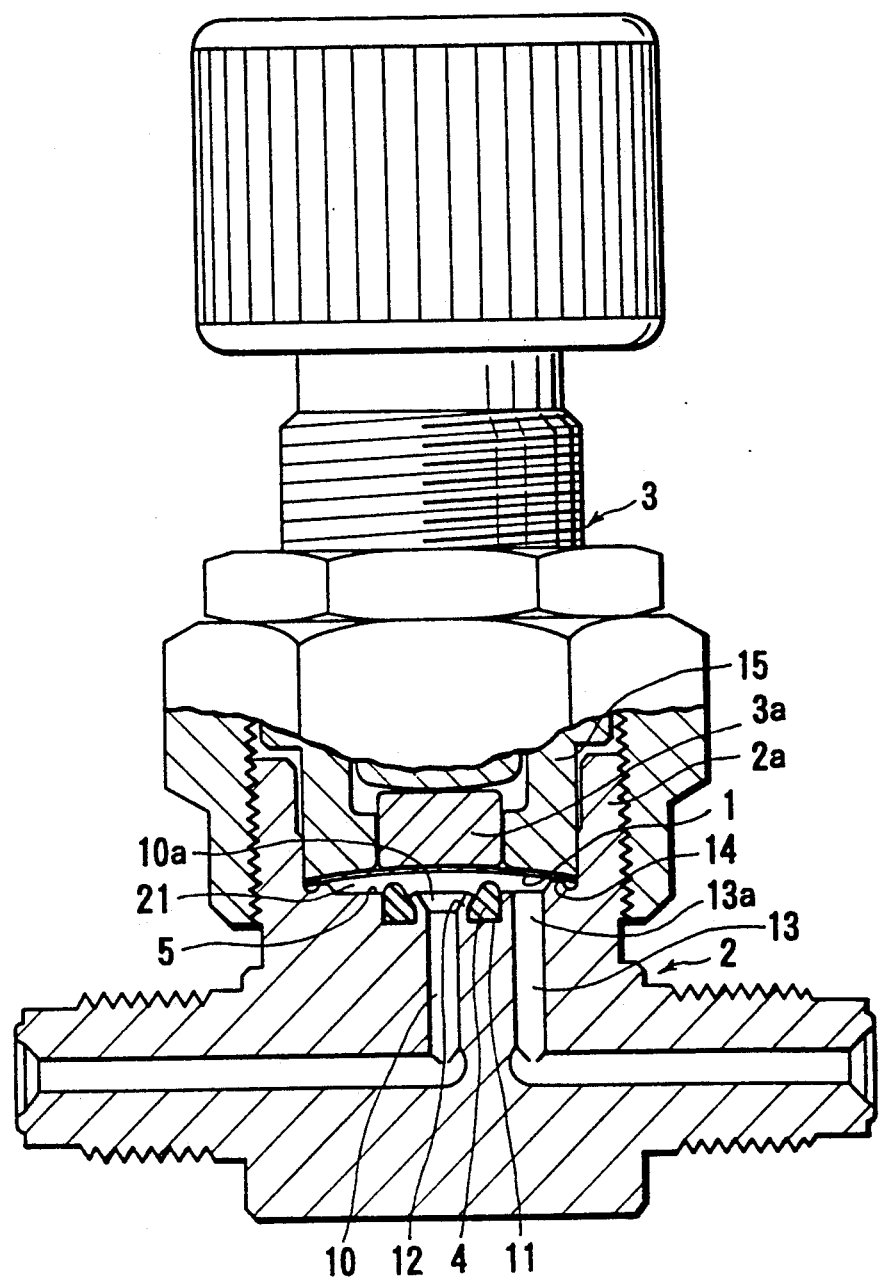

A preferred embodiment of the metal diaphragm valve will be described in full detail in accordance with the present invention, in conjunction with attached drawings. In the drawings, like parts are identified by like numbers.

Referring to FIG. 1, which illustrates a first preferred embodiment of the metal diaphragm valve 20, a domed metal diaphragm 1 is provided in a valve casing 2 which has an annular valve seat 4 centrally situated below the diaphragm, a cylindrical space 21 defined between the seat and the diaphragm, an inlet passage 10 and an outlet passage 13. The annular seat 4 is buried centrally in a cylindrical casing bed 5 at the bottom of the casing 2. The diaphragm 1 which is made of a thin elastic metal material is normally urged to form an upward bulge, and elastically flips down when enough pressure is exerted from above.

The inlet passage 10 is connected to a fluid source (not shown) which supplies fluid to the passage. Also, a valve drive system 3 is provided to operate the diaphragm 1 through a reciprocating piece 3a, which presses the diaphragm 1 in the middle, causing it to elastically cave in and come into contact with the valve seat to close the valve.

In the casing 2 is provided a cylindrical bonnet 15 stationary secured above the diaphragm 1, and the reciprocating piece 3a is movably inserted in a bore 2a drilled in the bonnet. A ring 14 is centrally formed on top of the casing bed 5 to support the diaphragm 1 along a periphery of the diaphragm 1.

The inlet passage 10 is centrally situated in the casing 2 and has an entrance port 10a which opens into the space 21 to allow fluid to enter the space. The outlet passage 13 is situated off center and has an exit port 13a through which, when the valve 20 is opened, the fluid is caused to flow into the outlet passage 13. When the drive system 3 releases the pressure exerted on the reciprocating piece 3a, the diaphragm 1 spring back to its initial position on its own stiffness, allowing fluid-flow relationship between the inlet passage 10 and the outlet passage 13.

The valve seat 4 preferably has a flat bottom and is rigidly implanted in an annular groove 11 centrally formed in the valve casing 2, concentrically of the circular entrance port 10a. Additionally, the annular seat 4 has a rounded top and has an inner wall 12 thereof tilted to have a wider diameter toward its bottom. The inlet passage 10 is shaped to have a wider diameter toward an upper edge of the entrance port 10a, sealingly receive therein the diaphragm 1, in conjunction with the inclined inner side of the valve seat 4, when the diaphragm is elastically moved into contact with the valve seat 4 in the closing action of the drive system 3.

Figure 2:
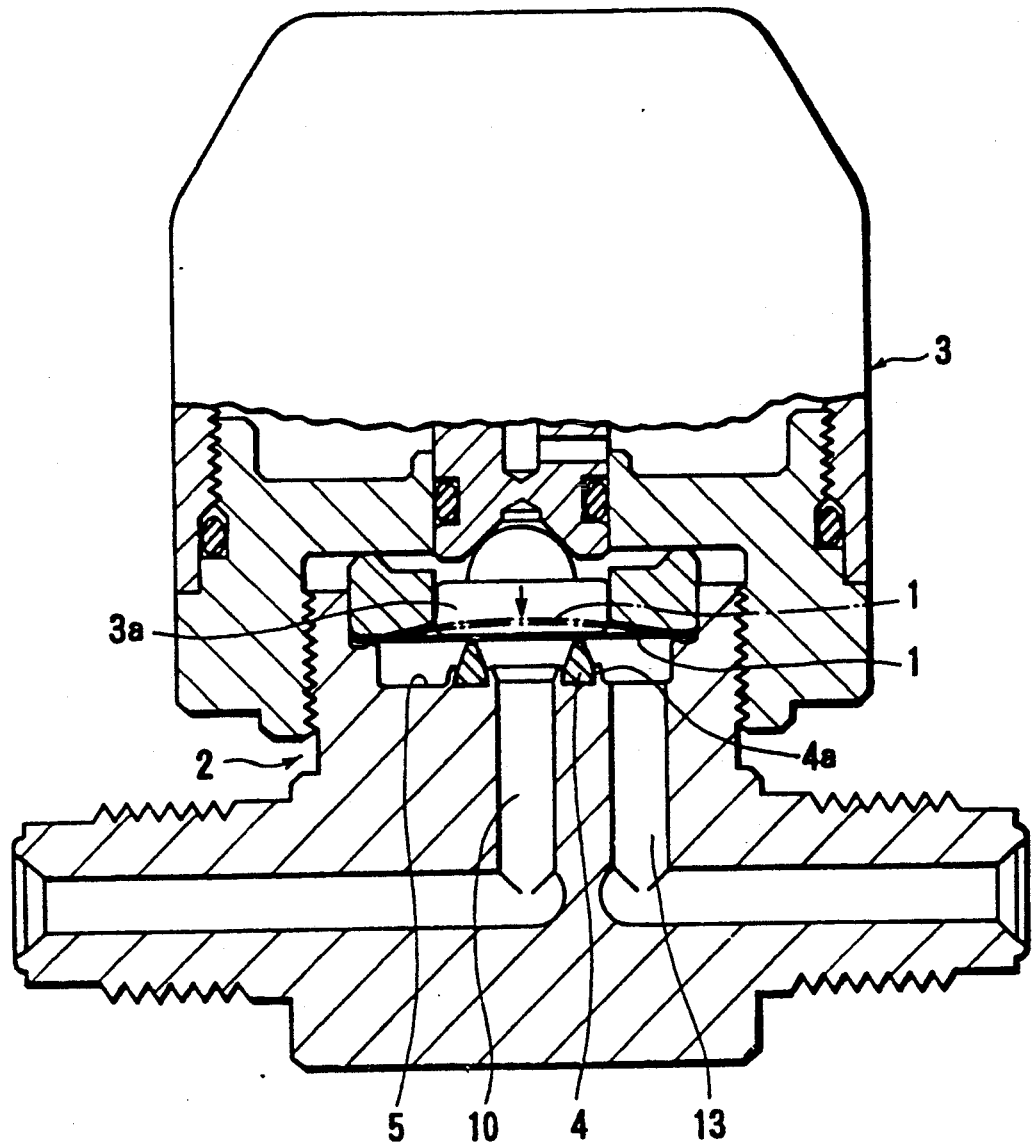

A principal feature of the embodiment is that the annular valve seat 4 is caulked in position in the casing bed 5 by widening the opening of the entrance port 10a into an inverted conical shape. This design eliminates using the conventional paired collars 4a (as shown in FIG. 2) to fixedly secure an annular valve seat in its valve casing bed.

With the above-mentioned structure of the valve 20, the valve casing bed 5 has a wide flat surface in its surface facing the diaphragm 1. This sufficiently wide space of the bed 5 makes it to help design a metal diaphragm valve of small size, because it allows easier machining and polishing of the valve seat and valve casing bed. This simplification of design is more advantageous in constructing micronized valves where multiple-stage electropolishing may be employed to finely smooth out the casing bed of a valve being assembled. The absence of the caulking collars 4a, as shown in FIG. 2, also eliminates a risk of fluid stagnation in dead zone that would have been developed by an irregular bumpy surface in the valve casing bed 5. In such dead zone, fluid stagnates and refuses to drain when the diaphragm is actuated to close the valve or when fluid has to be drained from the system and replaced.

In the valve 20 of this invention, the fluid flows smoothly from the entrance port 10a to the exit port 13a each time the diaphragm 1 is opened. When the diaphragm 1 is closed, all the fluid is drained out of the inside of the casing 2, so that there will be no residue of fluid when the diaphragm cracks open again.

The casing 2 may preferably be made of an anti-corrosion material such as SUS 316 steel or Hastelloy. The valve seat 4 may preferably be produced by multiple-stage electropolishing method and surface finishing.

In this particular embodiment, the design of the valve 20 is such that the inlet passage 10 is situated in the center of the casing bed 5 whereas the outlet passage 13 is provided at a location away from the center. However, this is a matter of choice to illustrate one preferred embodiment. In an alternate embodiment, the outlet passage may be centrally defined, with the inlet passage being positioned near the periphery of the bed 5, instead.

Moreover, the valve drive system 3 for the valve 20 can either be automatic or manual in construction.

What is claimed is:

1. In a metal diaphragm valve having a valve casing having therein a cylindrical bore and a casing bed, a domed diaphragm made of a resilient metal which is normally urged to bulge upward, a centrally disposed annular valve seat in the bed of the valve casing beneath the diaphragm, a valve drive system operatively connected to the diaphragm, an inlet passage formed in the bed of the valve and having an entrance port opening into the bore, the entrance port being situated concentrically centrally of the annular seat to supply fluid to the bore, and an outlet passage defined in the bed and from which fluid leaves the bore, in which the valve shuts the fluid-flow relationship between the inlet and outlet passages, when the valve drive system exerts pressure on the diaphragm to cause it to depress downward into contact with the valve seat, the improvements comprising a concentric annual groove in the casing bed surrounding the entrance port of the inlet passage, the annular groove being cut so as to have its outer top periphery flush with the horizontal plane of the casing bed, a portion of the annular valve seat positioned in the annular groove and extending above said casing bed, and said entrance port terminating in an upper rim, said rim being upset into a conical shape to embrace a portion of said valve seat.

2. A metal diaphragm valve as set forth in claim 1, wherein the annular valve seat has a conical inside wall, and is rounded at a top portion thereof.

3. A metal diaphragm valve as set forth in claim 1 or 2, wherein the annular valve seat is a tiny projection formed in the valve casing bed.

* * * * *